United States Patent [19]

Lin

[11] Patent Number: 4,891,195
[45] Date of Patent: Jan. 2, 1990

[54] SYNERGISTIC EFFECT OF OIL-SOLUBLE SURFACTANTS AND DIBASIC CARBOXYLIC ACIDS ON SO$_2$ REMOVAL ENHANCEMENT IN FLUE GAS DESULFURIZATION PROCESS

[75] Inventor: Mei-Jan L. Lin, Naperville, Ill.
[73] Assignee: Nalco Chemical Company, Naperville, Ill.
[21] Appl. No.: 176,564
[22] Filed: Apr. 1, 1988
[51] Int. Cl.$^4$ .............................................. C01B 17/00
[52] U.S. Cl. .................................... 423/243; 423/242; 252/351
[58] Field of Search ................................ 423/243, 242

[56] References Cited

U.S. PATENT DOCUMENTS

| | | | |
|---|---|---|---|
| 3,757,488 | 9/1973 | Austin et al. | 423/243 |
| 4,049,775 | 9/1977 | Majewsna et al. | 423/243 |
| 4,559,212 | 12/1985 | Erga | 423/243 |
| 4,741,890 | 5/1988 | Rose et al. | 423/242 |
| 4,795,626 | 1/1989 | Heisel et al. | 423/243 |

FOREIGN PATENT DOCUMENTS

| | | | |
|---|---|---|---|
| 2802829 · | 7/1979 | Fed. Rep. of Germany | 423/243 |
| 3308648 | 9/1984 | Fed. Rep. of Germany | 423/243 |
| 4018488 | 2/1979 | Japan | 423/243 |
| 4072762 | 6/1979 | Japan | 423/243 |

OTHER PUBLICATIONS

Kirth-Other, Encyclopedia of Chemical Technology, Third Edition, vol. 13, John Wiley & Sons, Inc., 1981, on p. 924, and in Hydrocarbon Process, 52, 118 (Nov. 1973).
McCutcheon's Detergent & Emulsifiers, North American Edition, publ. by McCutcheon Division, McPublishing Co, 1978.
"The HLB System", published by ICI Americans, Inc., 1976.
"Improvement of Fly Ash Alkali Utilization in FGD Systems" by M. Lin, R. Mouche, E. Ekis and P. Nassos of Nalco Chemical Company presented by the American Power Conference, Apr. 27–29, 1987.

*Primary Examiner*—Asok Pal
*Attorney, Agent, or Firm*—John G. Premo; John S. Roberts, Jr.; Anthony L. Cupoli

[57] ABSTRACT

A method of improving the SO$_2$ scrubbing efficiency of flue gas desulfurization scrubbers which comprises treating the scrubbers during the scrubbing operations with a dibasic carboxylic acid and an oil-soluble surfactant combined in a weight ratio of at least 1:3.

8 Claims, 4 Drawing Sheets

SYNERGISTIC EFFECT OF OIL-SOLUBLE SURFACTANTS AND DIBASIC CARBOXYLIC ACIDS ON $SO_2$ REMOVAL ENHANCEMENT IN FLUE GAS DESULFURIZATION PROCESS

INTRODUCTION

Flue gases from utilities and industrial boilers are subject to wet scrubbers to remove $SO_2$ therefrom. This Flue Gas Desulfurization (FGD) process operates using a basic neutralizing substance such as lime, limestone or fly ash.

Sulfur dioxide removal efficiency is the key measure of any desulfurization process. More cost-efficient $SO_2$ removal can result in substantial savings in reagent utilization, energy consumption, equipment protection, and solids disposal. Improved $SO_2$ removal efficiency is a necessity for scrubbers operating at the margins of emission requirements. Improved efficiency is needed in all FGD scrubbers, and is especially important for limestone slurry systems since the stoichiometric efficiency of limestone is normally poor.

Organic acids such as dibasic acid (DBA) have been used as buffering/solubilizing agents to increase limestone slurry scrubbing efficiency. Although this technology has been known for some time, it is practiced by only a few power plants. Inexpensive waste DBA products are obtained from Nylon and cyclohexanone manufacturing processes. This technology of making adipic acid from cyclohexanone is described in *Kirk-Othmer, Encyclopedia of Chemical Technology*, Third Edition, Vol. 13, John Wiley & Sons, Inc., 1981, on Pg. 924, and in *Hydrocarbon Process*. 52, 118 (November 1973).

Being a waste stream mother liquor, these DBA products suffer from non-uniformity of composition as well as precipitation and degradation. These problems add to the already inefficient high dosage requirements (typical 1,000–7,000 ppm continuous feed). DBA also solidifies at ambient temperature and seems to cause foaming in the scrubber. Concentrated DBA must be kept hot during transportation at 212°–266° F. (100°–130° C.) until reacting with scrubbing liquid.

Dibasic acids serve a dual function in the enhancement of $SO_2$ scrubbing. The acid functionality helps solubilize calcium carbonate particles into slurry liquid. Also, their characteristic pKa values (e.g. adipic acid, $pKa_1 = 4.26$, $pKa_2 = 5.03$) are generally in the pH control range of the recycled slurry. This provides extra buffer capacity to the bulk liquid.

In my co-pending application, Ser. No. 123,471, filed Nov. 20, 1987, entitled "Use of Oil-Soluble Surfactants in Flue Gas Desulfurization Systems", the disclosure of which is incorporated herein by reference, it is shown that oil-soluble surfactants also improve the $SO_2$ scrubbing efficiency of FGD scrubbers. These oil-soluble surfactants are described in the above mentioned co-pending application as follows:

The oil-soluble surfactants usable in the practice of the invention usually have an HLB within the range of 1–9 with a preferred HLB range being 1–5.

In most instances, the preferred surfactants are non-ionic. A large number of surfactants usable in the invention as well as their HLB numbers are described in *McCutcheon's Detergents & Emulsifiers, North American Edition*, published by McCutcheon Division, MC Publishing Co., 1978. For a more detailed description of the HLB, see "The HLB System" published by ICI Americas, Inc., 1976. Both of these publications are incorporated herein by reference.

The present invention relates to improving the $SO_2$ scrubbing efficiency of FGD scrubbers by using a blend of certain dibasic acids with certain oil-soluble surfactants.

THE INVENTION

The invention is directed to a method of improving the $SO_2$ scrubbing efficiency of FGD scrubbers. The method comprises treating the scrubbers during the scrubbing operations with a dibasic carboxylic acid and an oil-soluble surfactant combined in a weight ratio of at least 1:3 to 50:1, preferably 2:1 to 10:1. The amount of the above described product used to treat the scrubbers is within the range of 0.1 to 1,000 ppm. A preferred dosage is from 50–500 ppm based upon total weight or volume of the slurry.

THE DIBASIC CARBOXYLIC ACIDS

These acids may be selected from a large number of well-known dicarboxylic acids which are illustrated by the following:

Oxalic
Malonic
Succinic
Glutaric
Adipic
Pimelic
Suberic
Azelaic
Sebacic

Preferred carboxylic acids are the so-called waste dibasic acid products previously described which for convenience purposes are hereafter referred to as 'DBA'. The most effective dicarboxylic acids tend to be those having a high ratio of acid to molecular weight, hence acids such as adipic and similar dicarboxylic acids are preferred. Also, the dicarboxylic acids should have one pK in the 5.0–6.5 range. The pKa should be selected to correspond generally to the pH of the scrubber liquid.

MAPPING OF THE FIGURES

THE OIL-SOLUBLE SURFACTANTS

Typical oil-soluble surfactants of the types described above are set forth in the Glossary which is a part of this application. Their efficacy was evaluated using the following test method:

TEST METHOD

The $SO_2$ absorption module, or mini-scrubber, test design and operation are described in the paper "Improvement of Fly Ash Alkali Utilization in FGD Systems" by M. Lin, R. Mouche', E. Ekis, and P. Nassos of Nalco Chemical Company, presented at the American Power Conference, Apr. 27-29, 1987.

The mini-scrubber is typically run with 40 liters of slurry, 0.5%-1.5% solids concentration, ambient or 110° F., 5 cfm gas flow (mixed with air), and 700-2,500 ppm inlet $SO_2$ concentrations. Laboratory tap water of 300 'M' alkalinity was used to make up the slurry. Water analysis of a typical 1.5% limestone slurry at pH 6.2 is given in Table I. Several operating modes were used during this research.

SYNERGISTIC EFFECT

Comparative Performance and Surfactant Synergism with DBA

Since there is an existing market of 14 million pounds/year in waste stream DBA for $SO_2$ removal and limestone dissolution enhancement, it was of interest to test the performance of surfactants both with and against DBA. In the power generating utilities using limestone slurry and DBA, typical DBA dosage requirements are between 1,000 and 7,000 ppm.

Figure 2:
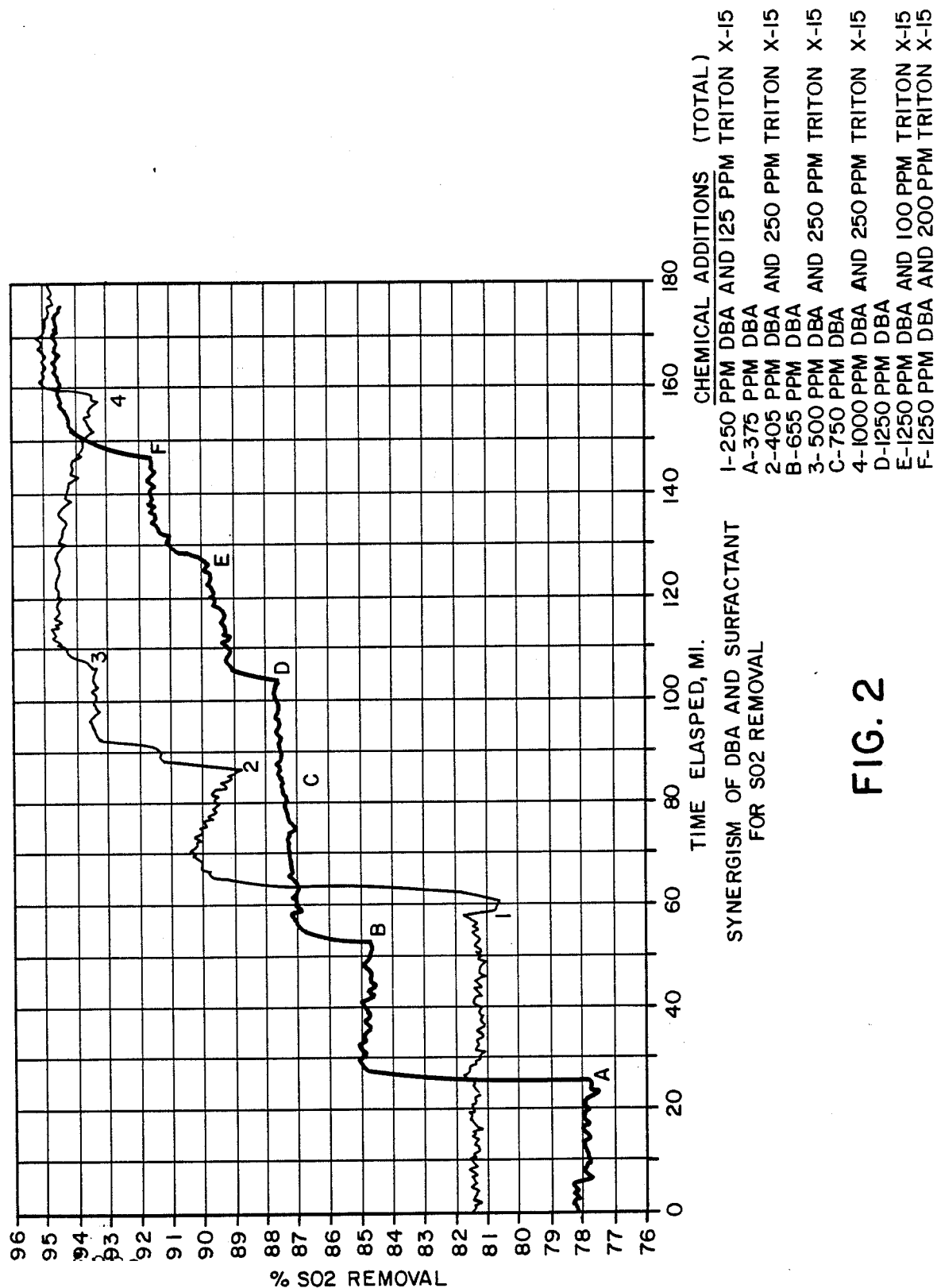
FIG. 2 is similar to FIG. 1 in meaning.

Comparative tests using the mini-scrubber were conducted. The results are listed below and graphically shown in Table 3 and FIGS. 2-4. The synergistic effect is obvious from these comparisons:

For example, in FIG. 2:

|  | Improvement of $SO_2$ Removal | |
|---|---|---|
|  | from | to |
| A. 1000 ppm DBA | 81% | 90% |
| 1. 250 ppm DBA + 125 ppm surf. (lower dosage) | 81% | 90% |
| 2. 405 ppm DBA + 250 ppm surf. | 81% | 94% | i.e.: Lower dosage, higher $SO_2$ removal

TABLE I

Water Analysis of a 1.5% Limestone Slurry

| Ions | ppm |
|---|---|
| Sodium (Na) | 230 |
| Potassium (K) | <0.1 |
| Boron (B) | 0.3 |
| Total Sulfur (S) | 420 |
| Total Silica | 18 |
| Calcium (Ca) | 390 |
| Magnesium (Mg) | 23 |
| Copper (Cu) | 0.04 |
| Manganese (Mn) | 0.18 |
| Strontium (Sr) | 0.60 |
| Zinc (Zn) | 0.07 |

Without Supplemental Alkalinity During the Run

Most of the surfactant screening was accomplished by slurry scrubbing with no additional alkalinity added during the experiment. Continual reduction of both slurry pH and %$SO_2$ removal as a function of time are expected. Up to six additives are introduced at 10 min. intervals (minimum) and at slurry pH values between 5.5 and 6.5. Since a constant decrease in %$SO_2$ removal is normal with decreased slurry pH, a positive effect of an additive is indicated by an increase or leveling-off of %$SO_2$ removal.

TESTING OF OIL-SOLUBLE SURFACTANTS

Ambient Temperature Testing of Non-ionic Surfactants Without Supplemental Alkalinity It was first noted that addition of a nonionic surfactant named IGEPAL CA-210 to limestone slurry at ambient temperature substantially increased $SO_2$ removal, when addition followed organic acid additions. The $SO_2$ removal improvement by the surfactant after organic acid addition was larger than that obtained with organic acids alone. Surfactant application was effective even at lower available reagent levels. These same positive results were noted with the use of a recycle ash slurry.

IGEPAL CA-210 is octylphenoxyl polyethyleneoxide ethanol, a nonionic surfactant with an HLB of 3.5. Tests were run to characterize effective surfactants by their types and hydrophilic/lipophilic balance (HLB) values. Tests results showed positive effects with blends of nonionic surfactants at HLB 2 and 4 while the favorable effect starts to diminish at HLB 8. Hence, low HLB, hydrophobic surfactants appeared to be most effective.

Screening of a large number of surfactants followed, with the emphasis on hydrophobic nonionic types. A few hydrophilic surfactants were also tested to verify the predicted negative results. A summary of the test results in terms of enhancement, no effect, or negative effect on $SO_2$ removal is given in Table II.

TABLE II

Summary of Surfactant's Performance in $SO_2$ Wet Scrubbers Using Limestone Slurry

| Positive Effect | No Effect | Negative Effect |
|---|---|---|
| HLB=2 (SPAN's) | HLB=8 (SPAN & TWEEN) |  |
| HLB=4 (SPAN's) |  |  |
| IGEPAL CO-210 | IEGPAL DM-430, | IGEPAL CA-420, 520 |
| IGEPAL CA-210 | IGEPAL DM-710 | IGEPAL CA-620 |
| IGEPAL RC-630 | IGEPAL RC-520 |  |
| IGEPAL CA-630 | IGEPAL CO-890, 990 |  |
| SPAN 20 | SPAN 60 (solids) |  |
| SPAN 85 | SPAN 65 |  |
|  | TWEEN 60 | TWEEN 80 |
|  | ALIPAL CD-128 | ALIPAL AB-436 |
|  | IGEPON T-33 |  |
|  | PVP K-30 |  |
| TRITON CF-10 |  | TRITON X-114 |
| TRITON GR-7M | TRITON X-155 |  |
| TRITON X-15 |  |  |
| DOSS | TRITON CF-32 | TRITON N-42, N-57 |
|  | TRITON N-60 |  |
|  | TRITON DF-12 |  |
| TETRONIC 701 | TETRONIC 704 (2) |  |
| TETRONIC 70R1, 110R1 |  |  |
| TETRONIC 90R1, 130R1 |  |  |
| TETRONIC 150R1 |  |  |
| TETRONIC 70R2 | TETRONIC 25R8, 150R8 |  |
|  | TETRONIC 908 |  |
| TETRONIC 70R4 | TETRONIC 50R4, 90R8 |  |
| TETRONIC 90R4 |  |  |
| TETRONIC 150R4 | TETRONIC 110R7 |  |
| TETRONIC 1304, 1502 |  |  |
|  | PLURONIC F77, F68 | PLURACOL E400 |
|  | PLURONIC L35 | PLURONIC L31 |
|  | PLURONIC L62D |  |
|  | PLURONIC L72 |  |
|  | PLURONIC 25R1 | PLURONIC L101 |
|  | PLURAFAC |  |

TABLE II-continued
Summary of Surfactant's Performance in SO₂ Wet Scrubbers Using Limestone Slurry

| Positive Effect | No Effect | Negative Effect |
|---|---|---|
| | RA-40 | |
| | PLURAFAC A-24 | |
| | PLURACOL P-410 | |
| | GAFAC RM-410, RS-410 | GAFAC RE-410 |
| | GAFAC BI-750 (rxn) | |
| | acidic | ANTARA LE-700 |
| | | ANTARA LM-400 |
| | | ANTARA HR-719 |
| | | ANTARA LK-500 |
| | ANTROX BL-214 | |
| ARLACEL 83 | ARLACEL 60 | ARLACEL 165 |
| | ATMUL 500 | |
| | ATSURF 2802 | |
| | MYRJ 53 | |
| | NIAX POLYOL LHT-240 | |
| ALFONIC 1012-60 | ALFONIC 1214-70 | |
| | | SURFONIC LF-17 |
| | | EMPHOS PS-220 |
| | EMULPHOGENE BC-610 | |
| | EMULPHOGENE BC-420 | |
| | NEKAL NF | |
| | NEKAL WT-27 | |
| | DOSS OT-100 | |
| | Hystrene 3695 | |
| | Niax Polyol | |
| | BRIJ 30 | BRIJ 93 |
| | BRIJ 52 | |
| WITCAMIDE 5138 | AMP-95 (R-2233) | Ethoduomeen T-13 |
| WITCONOL 14 | | |
| Mackamide NOA | Mackamide Ole. DEA | |
| Mackamide Soyamide DEA | | |
| KELIG 3000 | | |

The most effective surfactants were those classified as hydrophobic, oil-soluble/water insoluble, nonionic types with HLB's typically in the range of 1-5. These are available under the commercial names IGEPAL CA-210, IGEPAL CO-210, TRITON X-15, ARLACEL 83, SPAN 85, TETRONIC 701 and TETRONIC 70R1, 90R1, 110R1, 150R1, among others.

Nonionic alkanolamides (Witcamide 5138, Witconol 14, and Mackamides) also exhibited some activity. Kelig 3000, a carboxylated lignosulfonate made by Reed Lignin, was also shown to be effective, probably due to ligninsulfonate's hydrophobicity. Anionic dioctyl-sodium sulfosuccinate (DOSS) also gave positive results.

The degree of SO₂ removal enhancement varied between 1% and 30% due to variations in operating conditions. Effective TETRONIC surfactants, due to their basicity, also caused a pH increase which was rarely observed with the use of other surfactants.

RATIO AND USAGE OF DIBASIC CARBOXYLIC ACIDS TO OIL-SOLUBLE SURFACTANTS

As earlier indicated, the invention utilizes the dibasic acids to oil-soluble surfactants at a ratio of at least 1:3. A practical working ratio is between 1:3 to 50:1 with a preferred ratio being about 2:1 to 10:1. Dosages of these compositions can be within the range of 0.1 to 1,000 ppm, or preferably from 50–500 ppm based on the total weight or volume of the slurry.

EVALUATION OF THE INVENTION

To illustrate the invention, the test procedure described above was utilized. The results of combining DBA with the oil-soluble surfactant Triton X-15 in various ratios is set forth below in Table III.

TABLE III

| | Synergism with DBA | |
|---|---|---|
| | ppm DBA/Surfactant | % SO₂ Removal |
| 375 ppm* Total Dose | 375/0 | 84.5 |
| | 0/375 | 84.5 |
| | 250/125 (2:1) | 89.5 |
| 1250 ppm Total Dose | 1250/0 | 89.5 |
| | 0/1250 | 87.0 |
| | 1000/250 (4:1) | 95.5 |
| | 405/250 (1.6:1) | 93.5 |
| | 1250/0 | 89.5 |
| | 1250/200 | 95.0 |
| | 1000/250 (4:1) | 95.0 |
| | 1000/0 | 89.5 |
| | 250/125 | 89.5 |
| | 405/250 (1.6:1) | 93.5 |
| | 0 DBA/0 Surfactant | 78–81% |

Figure 1:
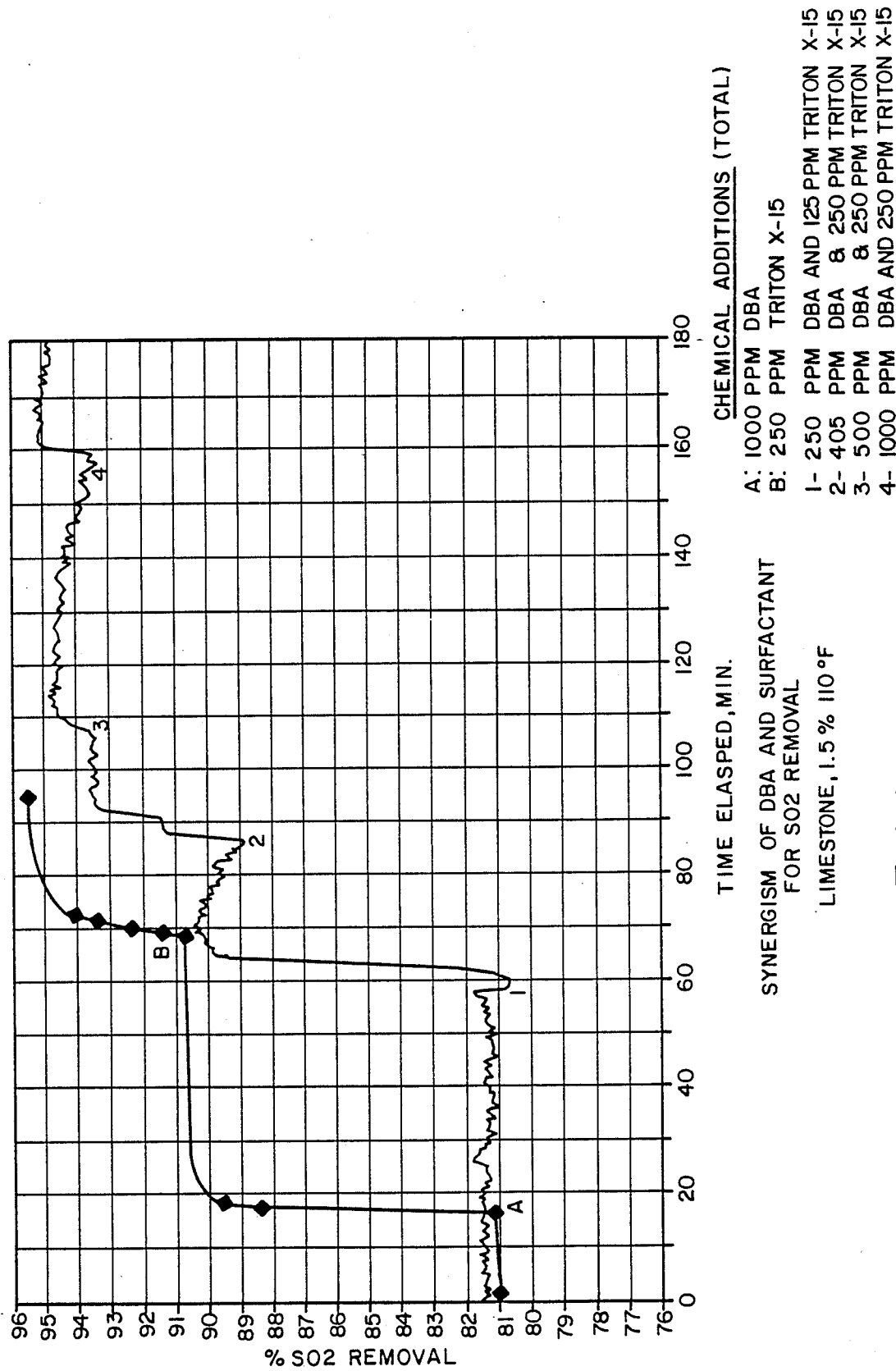
FIG. 1 shows percent $SO_2$ removal against time elapsed in minutes and synergism of DBA and surfactant.
Figure 3:
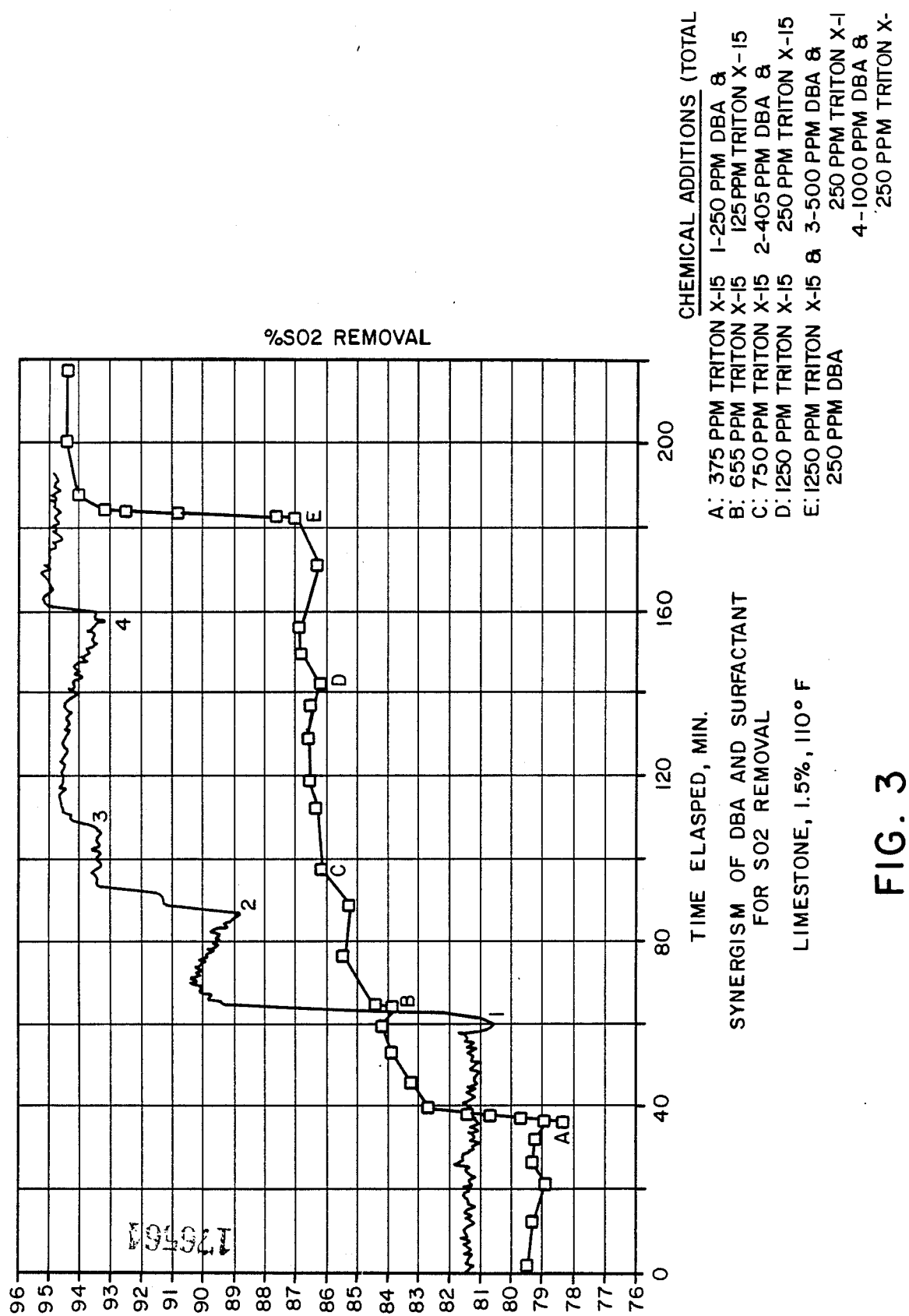
FIG. 3 is time elapsed in minutes for limestone (1.5 percent) at 110 degrees F. and shows synergism of DBA and surfactant.

1.5% Limestone slurry at 110° F., L/G = 63/1, Inlet SO₂ 750–850 ppm
*Based on weight of the slurry Additional Test results are set forth in FIGS. 1, 2 and 3.

Figure 4:
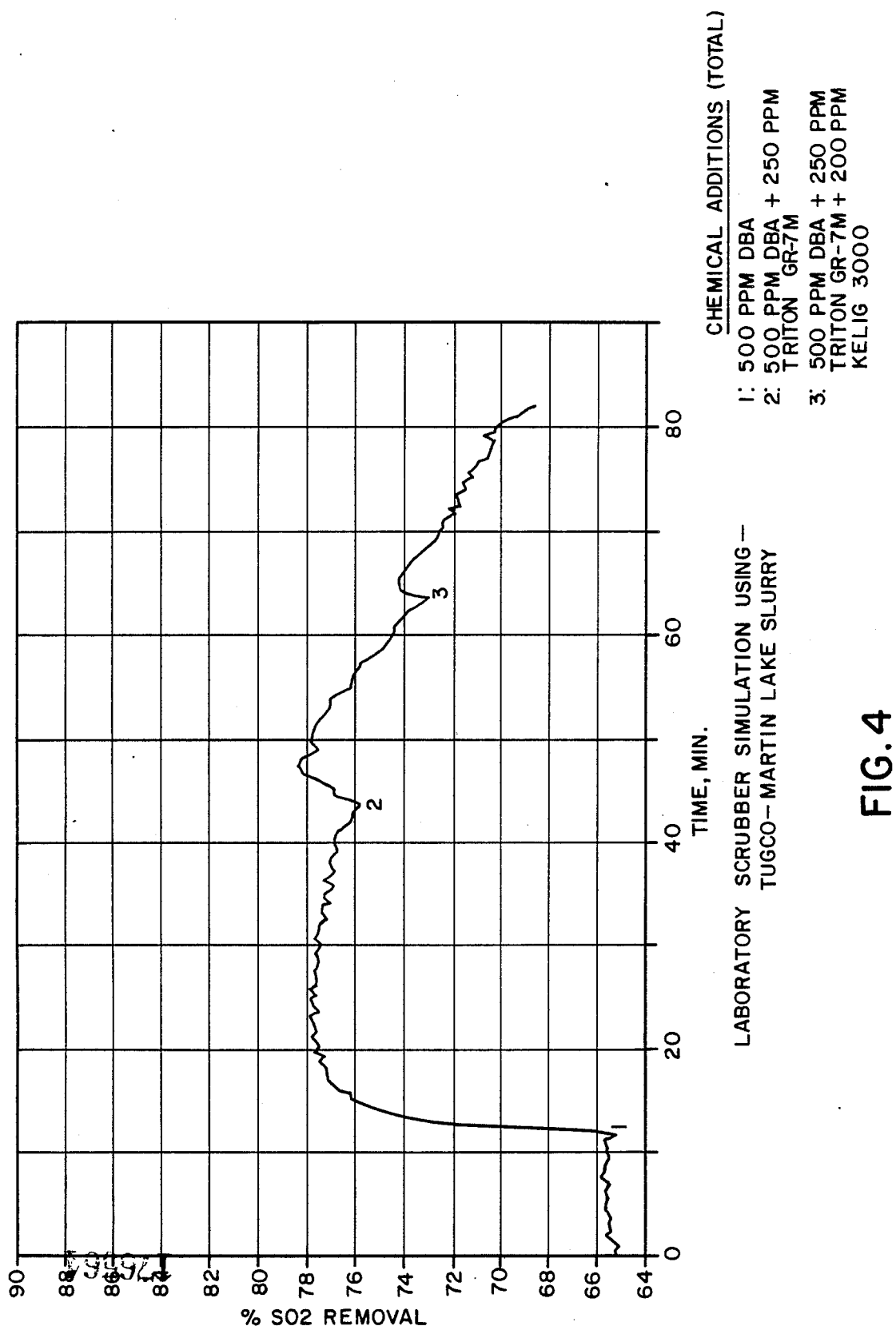
FIG. 4 shows laboratory scrubber simulation using Tugo-Martin Lake slurry and shows synergism of DBA and surfactant for a particular slurry.

To show the advantages of using the blend of dibasic acids and oil-soluble surfactants with limestone, FIG. 4 is presented.

BENEFITS OF THE INVENTION

A. Improves SO₂ removal by itself;
B. Has wide applicability, including limestone, lime, and fly ash systems;
C. Improves SO₂ removal synergistically;
D. Reaches a high SO₂ removal level unobtainable with DBA or surfactant used alone;
E. Reduces DBA dosage by one third to a half;
F. Enhances calcium sulfate formation;
G. Dissolutes limestone, lime, and fly ash to provide more calcium ions in slurry;
H. Reduces surface tension of slurry;
I. Increases slurry flow rate;
J. Does not introduce color to slurry;
K. Does not depress pH, unlike DBA;
L. Does not generate foam.

GLOSSARY
SURFACTANTS USED IN SO₂ ABSORPTION MODULE TESTING

| Name | Chemical Structure | HLB | T* | M** | Form |
|---|---|---|---|---|---|
| SPAN 20 | Sorbitan monolaurate | 8.6 | N | ICI | liq |
| SPAN 40 | Sorbitan monopalmitate | 6.7 | N | ICI | liq |
| SPAN 60 | Sorbitan monostearate | 4.7 | N | ICI | liq |
| SPAN 65 | Sorbitan tristearate | 2.1 | N | ICI | liq |
| SPAN 80 | Sorbitan monooleate | 4.3 | N | ICI | liq |
| SPAN 85 | Sorbitan trioleate | 1.8 | N | ICI | liq |

GLOSSARY
SURFACTANTS USED IN SO₂ ABSORPTION MODULE TESTING

| Name | Chemical Structure | HLB | T* | M** | Form |
|---|---|---|---|---|---|
| HLB = 2 | 8% SPAN 80 + 92% SPAN 85 | 2.0 | N | ICI | liq |
| HLB = 4 | 88% SPAN 80 + 12% SPAN 85 | 4.0 | N | ICI | liq |
| HLB = 8 | 65% SPAN 80 + 35% TWEEN 80 | 8.0 | N | ICI, Atlas | liq |
| ARLACEL 60 | Sorbitan monostearate | 4.7 | N | ICI | s |
| ARLACEL 83 | Sorbitan sequioleate | 3.7 | N | ICI | liq |
| ARLACEL 165 | Glycerol monostearate POE stearate | 11.0 | N | ICI | s |
| BRIJ 30 | POE(4) lauryl ether | 9.7 | N | ICI | liq |
| BRIJ 52 | Polyoxyethylene(2) cetylether | 5.3 | N | ICI | s |
| BRIJ 93 | Polyoxyethylene(2) oleylether | 4.9 | N | ICI | liq |
| MYRJ 53 | Polyoxyethylene(50) stearate | 17.9 | N | ICI | liq |
| ATMUL 500 | | 2.5 | N | ICI | liq |
| ATSURF 2802 | Butylated hydroxyanisole | 3.5 | N | ICI | s |
| TWEEN 60 | POE(20) sorbitan monostearate | 14.9 | N | Atlas | wax |
| TWEEN 80 | POE(20) sorbitan monoleate | 15.0 | N | Atlas | liq |
| TRITON N-42 | Nonylphenoxypoly(EO) ethanol | 9.1 | N | Rohm & H | liq |
| TRITON N-57 | Nonylphenoxypoly(EO) ethanol | 10.0 | N | Rohm & H | liq |
| TRITON N-60 | Nonylphenolpoly(EO) ethanol | — | N | Rohm & H | liq |
| TRITON X-15 | Octylphenoxypolyethyoxyethanol | 3.6 | N | Rohm & H | liq |
| TRITON N-114 | Octylphenolethyoxylate | 12.4 | N | Rohm & H | liq |
| TRITON N-155 | Alkylarylpolyether alcohol | 12.5 | N | Rohm & H | 90% l |
| TRITON DF-12 | Modified POE linear alcohol | 10.6 | N | Rohm & H | liq |
| TRITON GR-7M | Dioctylsodium sulfosuccinate (DOSS) | — | A | Rohm & H | 67% l |
| TRITON CF-10 | Alkylaryl polyether | 14.0? | N | Rohm & H | liq |
| TRITON CF-21 | same as above | — | N | Rohm & H | liq |
| TRITON CF-32 | same as above | — | N | Rohm & H | liq |
| TETRONIC 701 | block copolymers of EO & PO | 3.0 | N | BASF W | liq |
| TETRONIC 702 | same as above | 7.0 | N | BASF W | liq |
| TETRONIC 704 | same as above | 15.0 | N | BASF W | liq |
| TETRONIC 901 | same as above | 2.5 | N | BASF W | liq |
| TETRONIC 808 | same as above | 30.5 | N | BASF W | s |
| TETRONIC 50R4 | block copolymers of EO & PO | 8.9 | N | BASF W | liq |
| TETRONIC 70R2 | same as above | 4.8 | N | BASF W | liq |
| TETRONIC 70R4 | same as above | 7.9 | N | BASF W | liq |
| TETRONIC 90R4 | same as above | 7.1 | N | BASF W | liq |
| TETRONIC 90R8 | same as above | 12.9 | N | BASF W | s |
| TETRONIC 110R7 | same as above | 9.5 | N | BASF W | s |
| TETRONIC 150R4 | same as above | 5.4 | N | BASF W | pas |
| TETRONIC 150R8 | same as above | 11.2 | N | BASF W | s |
| TETRONIC 70R1 | same as above | 2.9 | N | BASF W | liq |
| TETRONIC 90R1 | same as above | 2.4 | N | BASF W | liq |
| TETRONIC 110R1 | same as above | 1.9 | N | BASF W | liq |
| TETRONIC 130R1 | same as above | 1.4 | N | BASF W | liq |
| TETRONIC 150R1 | same as above | 1.0 | N | BASF W | liq |
| TETRONIC 1304 | block copolymers of PO & EO | 13.5 | N | BASF W | pas |
| TETRONIC 1502 | same as above | 5.0 | N | BASF W | liq |
| PLURONIC F68 | block copolymers of PO & EO | 30.5 | N | BASF W | liq |
| PLURONIC F77 | same as above | 24.5 | N | BASF W | s |
| PLURONIC 25R1 | same as above | 4.0 | N | BASF W | liq |
| PLURONIC 25R8 | same as above | 12.1 | N | BASF W | s |
| PLURONIC L31 | same as above | 18.5 | N | BASF W | liq |
| PLURONIC L35 | same as above | 8.0 | N | BASF W | liq |
| PLURONIC L62D | same as above | 7.0 | N | BASF W | liq |
| PLURONIC L72 | same as above | 6.5 | N | BASF W | liq |
| PLURONIC L101 | same as above | 1.0 | N | BASF W | liq |
| PLURAFAC RA40 | Linear alcohol alkoxylates | 7.0 | N | BASF W | liq |
| PLURAFAC A-24 | same as above | 5.0 | N | BASF W | liq |
| PLURACOL E400 | Polyethylene glycol, MW 400 | — | N | BASF W | liq |
| PLURACOL P410 | Polyethylene glycol | — | N | BASF W | liq |
| GAFAC RE-410 | Free acid of complex organic | — | A | GAF | s |
| GAFAC BI-750 | phosphate ester | — | A | GAF | liq |
| GAFAC RM-410 | same as above | — | A | GAF | s |
| PVP K30 | Polyvinylpyrrolidone 30,000 MW | | | GAF | s |
| EMULPHOGENE | | | | | |
| BC-420 | Tridecyloxypoly(EO) ethanol | — | N | GAF | liq |
| BC-610 | same as above | — | N | GAF | liq |
| NEKAL NF | Na + alkylnaphthalenesulfonate | — | A | GAS | liq |
| NEKAL WT-27 | sulfonated aliphatic polyester | — | A | GAS | 70% l |
| IGEPAL CA-210 | octylphenoxylpoly(EO) ethanol | 3.5 | N | GAF | liq |
| IGEPAL CA-420 | same as above | 8.0 | N | GAF | liq |
| IGEPAL CA-520 | same as above | 10.0 | N | GAF | liq |
| IGEPAL CA-620 | same as above | | N | GAF | liq |
| IGEPAL CA-630 | same as above | 13.0 | N | GAF | liq |
| IGEPAL CO-210 | Nonylphenoxypoly(EO) ethanol | 4.6 | N | GAF | liq |
| IGEPAL CO-890 | same as above | 17.8 | N | GAF | s |
| IGEPAL CO-990 | same as above | 19.0 | N | GAF | s |
| IGEPAL RC-520 | phenoxypoly(EO) ethanol | 12.0 | N | GAF | liq |

-continued

GLOSSARY
SURFACTANTS USED IN SO₂ ABSORPTION MODULE TESTING

| Name | Chemical Structure | HLB | T* | M** | Form |
|---|---|---|---|---|---|
| IGEPAL RC-620 | same as above | 10.0 | N | GAF | liq |
| IGEPAL RC-630 | same as above | 12.7 | N | GAF | liq |
| IGEPAL DM-430 | Dialkylphenoxypoly(EO)ethanol | 9.4 | N | GAF | liq |
| IGEPAL DM-530 | same as above | 10.6 | N | GAF | liq |
| IGEPAL DM-710 | same as above | 13.0 | N | GAF | liq |
| IGEPON T-33 | Na + n-methyl-n-oleoyl taurate | — | A | GAF | liq |
| ALIPAL CD-128 | NH₄ + ethoxylate sulfate | — | A | GAF | 58% l |
| ALIPAL AB-436 | . | | | GAF | liq |
| ANATROX BL-214 | Aliphatic polyether | — | N | GAF | liq |
| ANTARA HR-719 | acid ester | — | — | GAF | liq |
| ANTARA CE-700 | acid ester | — | — | GAF | liq |
| ANTARA LK-500 | complex phosphate ester | — | A | GAF | liq |
| ANTARA LM-400 | acid ester | — | — | GAF | liq |
| ALFONIC 1012-60 | Ethoxylate | 12.0 | N | Conoco | liq |
| ALFONIC 1412-70/1214-70 | | | N | Conoco | liq |
| SURFONIC LF-17 | Alkyl polyoxyalkylene ether | 12.2 | N | Texaco | liq |
| WITCAMIDE 5138 | an alkanolamide, R2371 | 9.5 | N | Witco | liq |
| EMPHOS PS-220 | phosphate esters | — | A | Witco | liq |
| WITCONOL 14 | Polyglycerol fatty acid ester | — | N | Witco | liq |
| Ethoduomeen T13 | a fatty amine filimer | | | | liq |
| AMP-95 | 2-amino-2-methyl-1-propanol | | | | 95% l |
| Mackamides | | | | | |
| Oleadmide DEA | alkanolamide | — | N | McIntyr | liq |
| NOA, AZ 142 | alkanolamide | 6.5 | N | McIntyr | liq |
| NOA, BB-16 | same as above | 7.1 | N | McIntyr | liq |
| Soyamide DEA | Lot 7654, same as above | 8.1 | N | McIntyr | liq |
| KELIG 3000 | Carboxylated lignosulfonate | — | A | Reed Li | liq |
| JOY | commercial brand detergent | 20 | | | liq |

¹T*: Type of surfactant; A = anionic, C = cationic, N = nonionic
²M**: Manufacturer
³liq or l: Liquid

Having thus described my invention, I claim:

1. A method of improving the SO₂ scrubbing efficiency of flue gas desulfurization scrubbers which comprises conducting the scrubbing operation in such scrubbers in the presence of a dibasic carboxylic acid and an oil-soluble surfactant combined in a weight ratio of at least 1:3 to 50:1.

2. The method of claim 1 where the oil-soluble surfactant has an HLB within the range of 1-9.

3. The method of claim 1 where the oil-soluble surfactant has an HLB within the range of 1-5.

4. The method of claim 1 where the oil-soluble surfactant is non-ionic.

5. The method of claim 1 where the dicarboxylic acid is a crude adipic acid.

6. The method of claim 1 where the scrubbers also utilizes either lime, limestone or fly ash.

7. The method of claim 1 where the dibasic carboxylic acid and an oil-soluble surfactant are combined in a weight ratio of 2:1 to 10:1.

8. The method of claim 1 wherein the dibasic carboxylic acid and an oil-soluble surfactant are combined in a synergistic mixture on a ratio of at least 1:3 to 50:1.

* * * * *